(12) United States Patent
Bowen

(10) Patent No.: US 6,579,201 B2
(45) Date of Patent: *Jun. 17, 2003

(54) ELECTRIC HYBRID FOUR-WHEEL DRIVE VEHICLE

(75) Inventor: Thomas C. Bowen, Rochester Hills, MI (US)

(73) Assignee: New Venture Gear, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/963,286

(22) Filed: Sep. 26, 2001

(65) Prior Publication Data

US 2002/0045507 A1 Apr. 18, 2002

Related U.S. Application Data

(63) Continuation-in-part of application No. 09/643,238, filed on Aug. 22, 2000.

(51) Int. Cl.[7] .............................................. F16H 3/72
(52) U.S. Cl. ........................................................ 475/5
(58) Field of Search ............................................... 475/5

(56) References Cited

U.S. PATENT DOCUMENTS

| | | | | |
|---|---|---|---|---|
| 5,558,589 A | | 9/1996 | Schmidt | |
| 5,730,676 A | * | 3/1998 | Schmidt | 475/5 |
| 5,931,757 A | * | 8/1999 | Schmidt | 475/2 |
| 5,935,035 A | * | 8/1999 | Schmidt | 475/5 |
| 6,041,877 A | | 3/2000 | Yamada et al. | |
| 6,053,833 A | | 4/2000 | Masaki | |
| 6,083,138 A | | 7/2000 | Aoyama et al. | |
| 6,083,139 A | | 7/2000 | Deguchi et al. | |
| 6,090,005 A | * | 7/2000 | Schmidt et al. | 475/5 |
| 6,098,733 A | | 8/2000 | Ibaraki et al. | |
| 6,110,066 A | * | 8/2000 | Nedungadi et al. | 475/5 |
| 6,358,173 B1 | * | 3/2002 | Klemen et al. | 475/5 |
| 6,371,878 B1 | * | 4/2002 | Bowen | 475/5 |
| 6,478,705 B1 | * | 11/2002 | Holmes et al. | 475/5 |

* cited by examiner

*Primary Examiner*—Dirk Wright
(74) *Attorney, Agent, or Firm*—Harness, Dickey & Pierce P.L.C.

(57) ABSTRACT

An electric continuously variable transmission includes first and second planetary gear sets each having a corresponding electric motor/generator. Both planetary gear sets are integrally linked to an input shaft that transfers torque from an engine. The electric motor/generators switch between driving and retarding rotation of the corresponding planetary gear set to generate various ranges, providing variable transmission speed ratios. A brake may be selectively engaged producing an overdrive range for cruising speeds. The electric continuously variable transmission drives a first driveline for driving a first pair of wheels. A controller and battery are also provided for respectively controlling the various electric motor/generators and either storing or providing energy.

51 Claims, 4 Drawing Sheets

ELECTRIC HYBRID FOUR-WHEEL DRIVE VEHICLE

This application is a continuation-in-part of U.S. patent application Ser. No. 09/643,238 filed on Aug. 22, 2000. The disclosure of which is incorporated herein by reference.

FIELD OF THE INVENTION

The present invention relates generally to hybrid vehicles and more particularly to an electric hybrid four-wheel drive vehicle.

BACKGROUND OF THE INVENTION

The powertrains of conventional vehicles are designed to provide more power than required for the vehicle at cruising speeds. Specifically, the engine of conventional vehicles is larger than required to provide power for acceleration and hill climbs. This extra power is not required once the vehicle is at cruising speed. As a result, conventional vehicle powertrains are inefficient.

Therefore, it is desirable to have an improved vehicle powertrain for implementation in a vehicle, such as a hybrid vehicle, which overcomes inefficiencies inherent in a conventional powertrain.

Additionally, various types of continuously variable transmissions (CVTs) have been developed throughout the years. The object of a CVT is to provide a continuously variable drive ratio from a transmission enabling an engine to run at an optimum point on a brake specific fuel consumption curve. Essentially, CVTs aim at improving engine efficiency by enabling the engine to continuously run at its most efficient point. Due to the significant complexity, traditional CVTs have posed problems in both implementation and application. Traditional belt drive-type CVTs are also inefficient in that significant parasitic losses occur in achieving continuously variable transmission ratios. Moreover, such devices are power limited.

Therefore, it is desirable in the industry to provide an improved CVT for implementation in a vehicle, such as a hybrid vehicle, which overcomes the deficiencies of traditional CVTs.

SUMMARY OF THE INVENTION

In achieving the above identified objectives, the present invention provides a continuously variable transmission comprising a first planetary gear set, a second planetary gear set operably coupled to said first planetary gear set, an input shaft rotatably coupled to each of the first and second planetary gear sets for selectively providing a drive torque, an output shaft rotatably coupled to the second planetary gear set, a first electric motor operably coupled to the first planetary gear set for selectively functioning to one of either rotatably drive the first planetary gear set and retard rotation of the first planetary gear set, and a second electric motor operably coupled to the second planetary gear set for selectively functioning to one of either rotatably drive the second planetary gear set and retard rotation of the second planetary gear set. The first and second electric motors cooperate to selectively manipulate rotation of the first and second planetary gear sets for varying a drive ratio between the input shaft and the output shaft.

The present invention further provides a hybrid vehicle comprising an engine, the above-described transmission operably attached to the engine, and a first driveline operably interconnected with the output shaft for driving a first wheel. The hybrid vehicle may further comprise a second driveline operably interconnected with the output shaft for driving a second wheel, thereby providing a multi-wheel drive vehicle.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art.

DETAILED DESCRIPTION OF THE PREFERRED EMBODIMENT

At the outset, it is important to note that the herein described embodiment is a preferred embodiment and merely exemplary in nature. Being exemplary, the preferred embodiment is in no way intended to limit the invention or its application.

Figure 1:
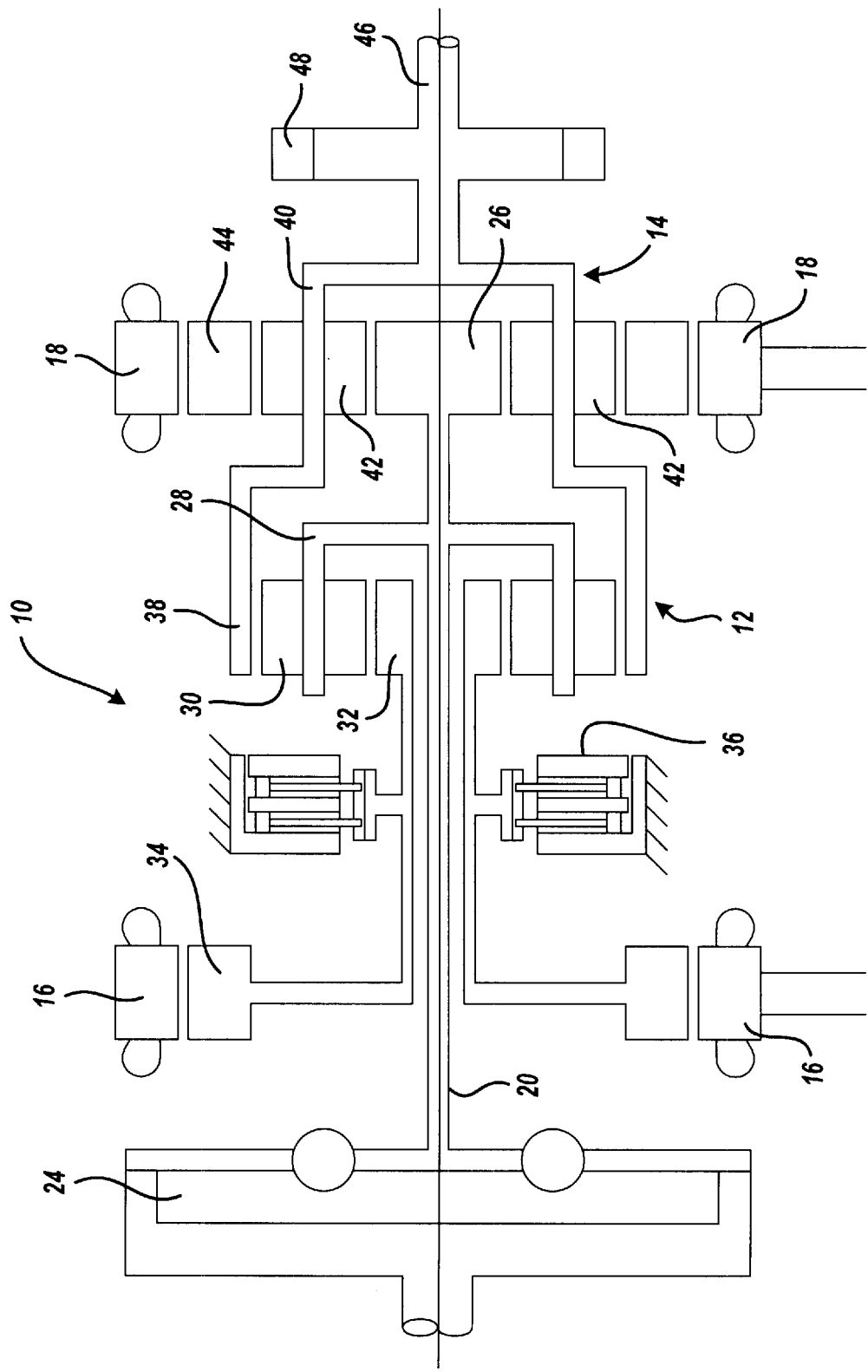
FIG. 1 is a schematic view of an electric continuously variable transmission according to the principles of the present invention.

With reference to FIG. 1, a schematic view of a first exemplary embodiment of an electric continuously variable transmission (CVT) 10 is shown. The electric CVT 10 comprises a first planetary gear set 12, a second planetary gear set 14, a first electric motor/generator 16 operably coupled to the first planetary gear set 12 and a second motor/generator 18 operably coupled to the second planetary gear set 14. An input shaft 20 is externally driven by an engine 22 (see FIG. 2) through a connection 24 and an output shaft 46 provides output drive torque to an external system. The connection 24 is preferably a conventional flywheel and vibration damper. The first and second planetary gear sets 12, 14 are selectively manipulated by the first and second electric motor generators 16, 18, respectively, for providing continuously variable drive ratios between the input shaft 20 and the output shaft 46.

The input shaft 20 is connected to a sun gear 26 of the second planetary gear set 14 and a carrier 28 of the first planetary gear set 12. A plurality of planetary gears 30 are rotatably supported on the carrier 28. A sun gear 32 of the first planetary gear set 12 is rotatably supported about the input shaft 20 and is connected to both the first electric motor/generator 16 by a gear 34 and a lock-up clutch or brake 36. The brake 36 can be selectively engaged to prohibit rotation of the sun gear 32. A ring gear 38 of the first planetary gear set 12 is connected to a carrier 40 of the second planetary gear set 14. The ring gear 38 is meshingly engaged with the planetary gears 30 which are also meshingly engaged with the sun gear 32. A plurality of planetary gears 42 are rotatably supported on carrier 40. The second electric motor/generator 18 is connected to a ring gear 44 of the second planetary gear set 14. The ring gear 44 is meshingly engaged with the planetary gears 42 which are also meshingly engaged with the sun gear 26. The output shaft 46 is connected to the carrier 40 and includes a parking pawl 48 disposed thereon.

Figure 2:
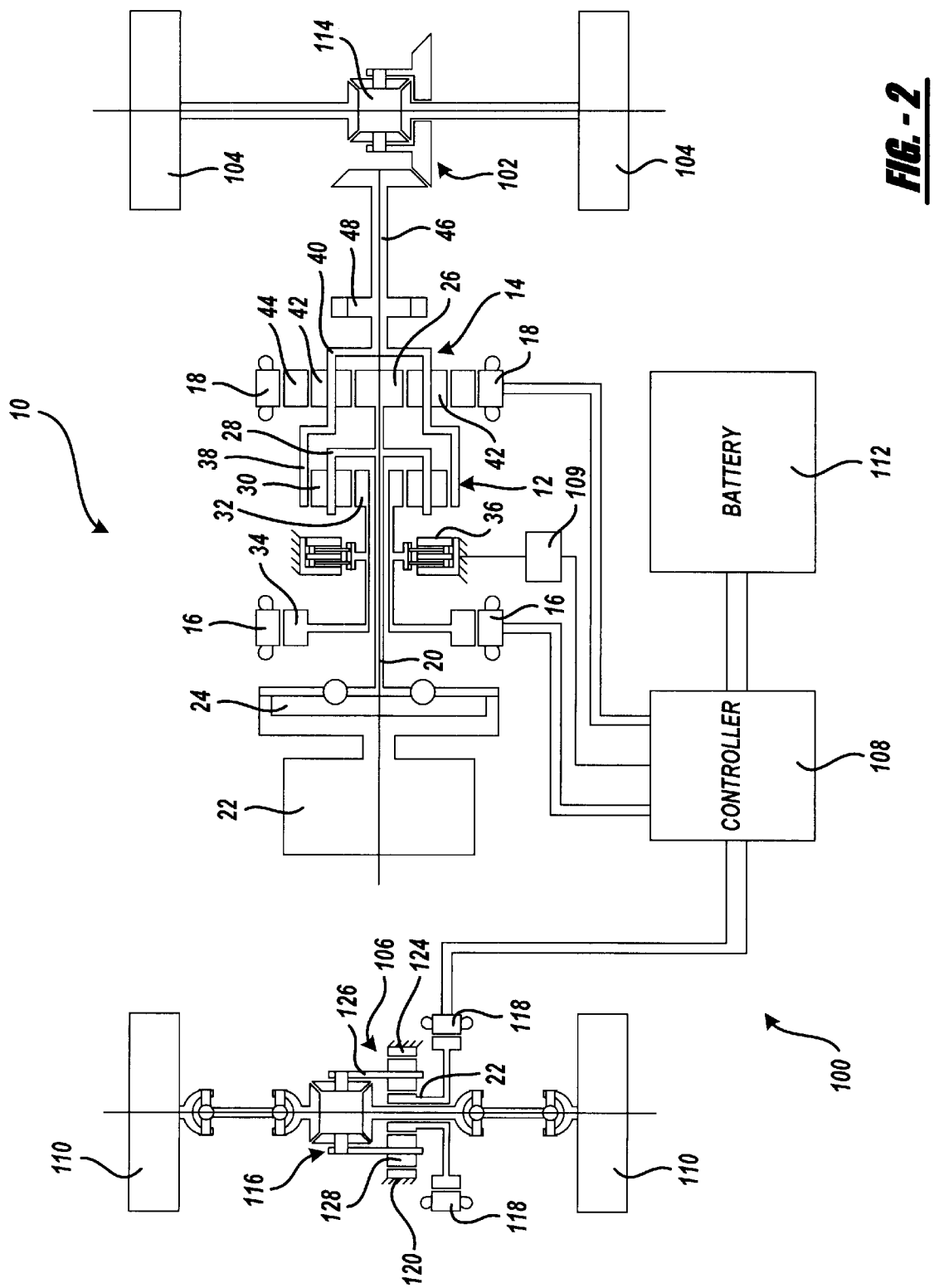
FIG. 2 is a schematic view of a hybrid vehicle implementing the electric continuously variable transmission of FIG. 1.

Referencing FIG. 2, a hybrid vehicle powertrain 100 is shown having the electric CVT 10 implemented therein. The hybrid vehicle powertrain 100 includes the engine 22 operably interconnected with the electric CVT 10, a rear axle assembly 102 operably interconnected to the electric CVT 10 by the output shaft 46 for driving a pair of real wheels 104, a front axle assembly 106 operably interconnected to the electrical CVT 10 by a controller 108 for driving a pair of front wheels 110. A battery 112 is also included and is in electrical communication with the controller 108. Further, each of the first and second electric motor/generators 16, 18 are in electrical communication with the controller 108. The controller 108 manages the driving and generating modes of the first and second electric motor/generators 16, 18, as well as managing the charge and discharge of the battery 112. In this manner, the first and second motor/generators may selectively manipulate the first and second planetary gear sets 12, 14 for continuously varying the drive ratio of the electric CVT 10. Also included is an actuator 109 in operative communication between the brake 36 and the controller 108 for selectively engaging the brake 36, as described in further detail herein.

The output shaft 46 is connected to a rear differential 114 of the rear axle assembly 102 for driving rear differential 114, in turn driving the rear wheels 104. The front axle assembly 106 includes a front differential 116 that that is driven by a third electric motor/generator 118 through a third planetary gear set 120. The third electric motor/generator 118 is in electrical communication with the controller 108. The third planetary gear set 120 includes a sun gear 122 driven by the third motor/generator 118. A ring gear 124 of the third planetary gear set 120 is fixed from rotating and a carrier 126 provides an input to the front differential 116. A plurality of planetary gears 128 are rotatably mounted to the carrier 126. The third electric motor/generator 118 is operated by the controller 108 and powered by the battery 112.

While the hybrid vehicle powertrain 100 is at rest with the engine 22 running, the ring gear 44 rotates opposite to the direction of rotation of input shaft 20, at a reduced speed: The ring gear 44 drives the second electric motor/generator 18, functioning in a generation mode. The electric energy that the second electric motor/generator 18 generates is fed to the first electric motor/generator 16. This event is termed "power recirculation". If enough electrical energy is generated, the second electric motor/generator 18 may also feed power to the third electric motor/generator 118 and/or the battery 112. Once a predetermined level of power has been created, a reaction torque produced by the second electric motor/generator 18 will drive the hybrid vehicle powertrain 100 at low speed. This simulates the feel of a conventional automatic transmission without the power loss associated with automatic transmissions.

As the second electric motor/generator 18 absorbs more power, the rotational speed of the ring gear 44 slows and the hybrid vehicle powertrain 100 accelerates. It is anticipated that an exemplary low speed ratio of 5.30:1 is achievable as the rotational speed of the ring gear 36 approaches zero. As the rotational speed of the ring gear 44 passes zero, the second electric motor 18 switches from a generator mode to a motor mode and the first electric motor/generator 16 switches to a generator mode. The first electric motor/generator 16 absorbs energy from the first planetary gear set 12 for feeding power to the second electric motor/generator 18, helping to drive the hybrid vehicle powertrain 100 in a mid speed range operating mode. When the rotational speed of the sun gear 32 and the first electric motor/generator 40 approach zero, it is anticipated that an exemplary overdrive speed ratio of 0.77:1 is achievable. Upon achieving this speed ratio, the brake 36 is applied and all power from the engine 22 is transferred mechanically for providing maximum efficiency.

Reverse operation is achieved by the second electric motor/generator 18 driving the ring gear 44 faster in a reverse direction than the engine 22 normally drives it. In other words, since the engine 22 typically drives the ring gear 44 in a direction opposite its own rotational direction, the second electric motor/generator 18 must drive the ring gear 44 in the same rotational direction as the engine 22 to achieve reverse. It is anticipated that an exemplary reverse speed ratio of 6.37:1 is achievable.

Figure 3:
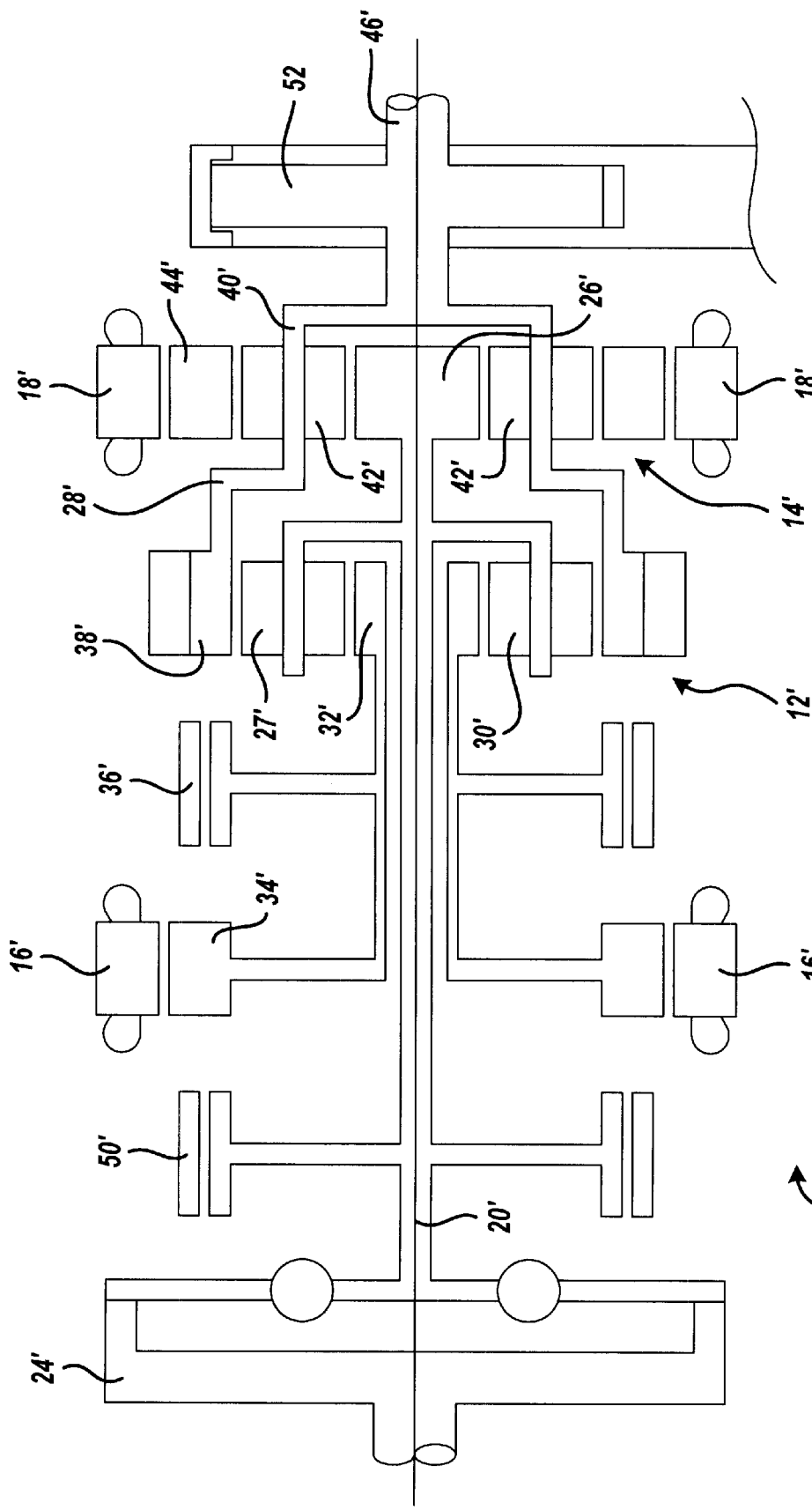
FIG. 3 is a schematic view of an alternative embodiment of an electric continuously variable transmission according to the principles of the present invention.

With particular reference to FIG. 3, an alternative exemplary embodiment of an electric CVT 10' is shown. The following description of the electric CVT 10' will include like reference numerals to the electric CVT 10, followed by prime ('), for referencing like components. The electric CVT 10' includes a first planetary gear set 12', a second planetary gear set 14' and first and second electric motor/generators 16', 18' in operative communication with the first and second planetary gear sets 12', 14', respectively. An input shaft 20' is externally driven by an engine 22' (see FIG. 4) through a connection 24'. The connection 24' is preferably a conventional vibration damper. An output shaft 46' is operably interconnected with the second planetary gear set 14'. The first and second planetary gear sets 12', 14' are selectively manipulated by the first and second electric motor generators 16', 18', respectively, for providing continuously variable drive ratios between the input shaft 20' and the output shaft 46'.

A sun gear 26' is fixedly attached to an end of the input shaft 20' and a carrier 28' of the first planetary gear set 12' is fixedly attached intermediate the length of the input shaft 20'. A brake 50 is also included and is disposed intermediate the length of the input shaft 20' and is selectively activated for braking rotation of the input shaft 20', thereby braking rotation of the sun gear 26' and the carrier 28'. A sun gear 32' of the first planetary gear set 12' is rotatably supported about the input shaft 20' and operably attached to both the first electric motor/generator 16' by a gear 34' and a brake 36'. The brake 36' is selectively engageable to prohibit rotation of the sun gear 32'. A ring gear 38' of the first planetary gear set 12' is operably interconnected with a carrier 40' of the second planetary gear set 14'. The second electric motor/generator 18' is operably attached to a ring gear 38' and the carrier 40'. The carrier 40' is fixed for rotation with an output shaft 46'. A first transfer gear 52 is fixedly attached to the output shaft 46' for transferring drive torque, as discussed in further detail hereinbelow.

Figure 4:
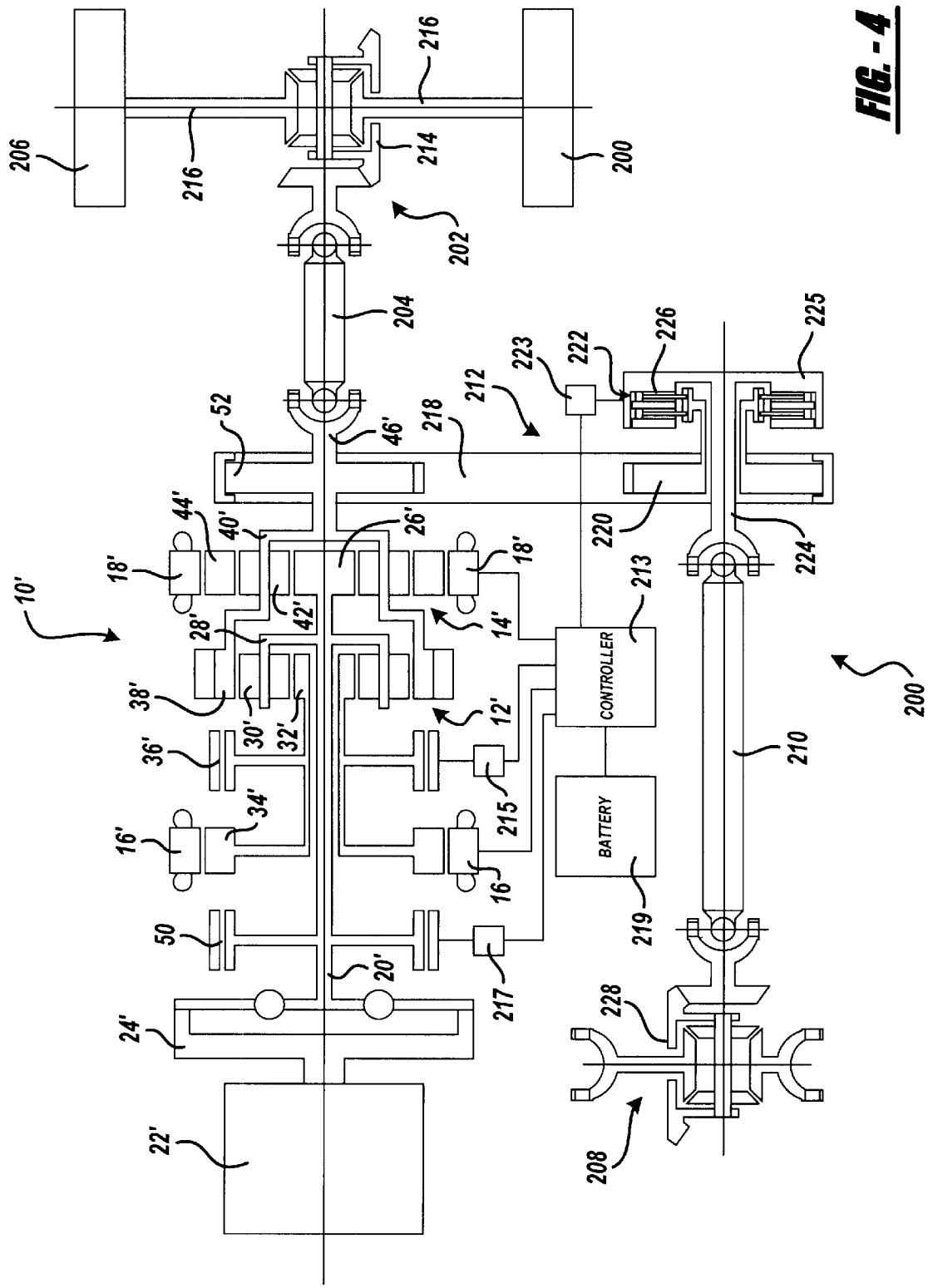
FIG. 4 is a schematic view of an alternative embodiment of a hybrid vehicle implementing the electric continuously variable transmission of FIG. 3.

Referencing FIG. 4, an alternative hybrid vehicle powertrain 200 is shown having the electric CVT 10' implemented therein. The hybrid vehicle powertrain 200 includes the engine 22' operably interconnected with the electric CVT 10', a rear axle assembly 202 operably interconnected with the electric CVT 10' by a propshaft assembly 204 for driving a pair of rear wheels 206, and a front axle assembly 208 operably interconnected with the electric CVT 10' by a propshaft assembly 210 and a transfer mechanism 212 for driving a pair of front wheels (not shown). A controller 213 is in electric communication with the first and second electric motor/generators 16', 18', a first actuator 215 and a second actuator 217. The first and second actuators are in operative communication with the brakes 36', 50, respectively, for selectively actuating the brakes 36', 50. The controller 213 controls actuation of the first and second actuators 36', 50, the first and second electric motor/generators 16', 18' and interconnects the electric CVT 10' with a battery 219.

As described previously, the input shaft 20' of the electric CVT 10' is connected to the engine 22' via the connection 24'. The propshaft assembly 204 interconnects the output shaft 46' to a differential 214 of the rear axle assembly 202. A pair of drive axles 216 interconnects the rear wheels 206 with the differential 214. Thus, the electric CVT 10' drives the rear wheels 206 by transmitting torque from the output shaft 46', through the propshaft assembly 204, to the differential 214 and out to the rear wheels 206.

The transfer mechanism 212 includes the first transfer gear 52 of the electric CVT 10', a transfer chain 218, a second transfer gear 220, a clutch pack 222 and an output shaft 224. The transfer chain 218 interconnects the first and second transfer gears 52, 220, enabling the first transfer gear 52 to drive the second transfer gear 220. The second transfer gear 220 is rotatably supported about the output shaft 224 and is fixed for rotation with a set of clutch plates 226 of the clutch pack 222. The clutch pack 222 is fixed for rotation with the output shaft 224 and is in operative communication with an actuator 223 for selectively actuating the clutch pack 222. The actuator 213 is further in operative communication with the controller 213. The clutch plates 226 interact with the clutch pack 222 for selectively retarding rotational motion of the clutch plates 226 relative to the clutch pack 222. In this manner, the amount of power transmitted from the first transfer gear 52, through the second transfer gear 220, through the clutch pack 222 and ultimately the output shaft 224, may be manipulated as driving conditions require. The output shaft 224 is interconnected with the propshaft assembly 210 for driving the propshaft assembly 210. The propshaft assembly 210 is further interconnected with a differential 228 of the front axle assembly 208 for driving the pair of front wheels (not shown).

The hybrid vehicle powertrain 200 operates in one of either a hybrid mode, an electric mode or a power generation mode. In the hybrid mode, when the hybrid vehicle powertrain 200 is stationary, the ring gear 44' of the second planetary gear set 14' rotates opposite to the rotation of the engine 22', at a reduced speed. The second motor/generator 18', being fixed to the ring gear 44', is in the generation mode generating power that is fed either to the first motor/generator 16', or to the battery 219. Upon the development of a small amount of electric power, a reaction torque produced by the second motor/generator 18' will drive the hybrid vehicle powertrain 200 at low speeds, simulating the feel of an automatic transmission, without the power loss.

As the second motor/generator 18' absorbs more power, the ring gear 44' slows and the hybrid vehicle powertrain 200 accelerates. Concurrently, the first motor/generator 16' may drive the sun gear 32' of the first planetary gear set 12', thereby assisting the engine 22'. As the ring gear 44' approaches and passes zero rotational speed, the second motor/generator 18' switches to a drive mode and the first motor/generator 16' switches to a generation mode. The first motor/generator 16' absorbs power form the first planetary gear set 12' to drive the second motor/generator 18', thereby assisting the engine 22' in driving the hybrid vehicle powertrain 200. As the first motor/generator 16' generates power, it retards rotation of the sun gear 32' of the first planetary gear set 12' until the sun gear 32' stops rotating. At this point, the brake 36' is applied and engine power is mechanically transferred through the electric CVT 10' for maximum efficiency. Reverse operation is achieved, as detailed above, by the second electric motor/generator 18' driving the ring gear 44' faster in reverse than the engine 22' would normally drive it.

In the electric mode, power is selectively supplied by the battery 219, through the controller 213, to drive either or both the first and second electric motor/generators 16', 18', thereby driving the first and second planetary gear sets 12', 14'. Because the engine 22' is stopped, the brake 50 is actuated to hold a reaction torque that results from driving the first and second planetary gear sets 12', 14'. It is anticipated that the electric mode may drive the hybrid vehicle powertrain 200 up to speeds of 40 mph, reducing fuel consumption to zero. In the power generation mode, with the hybrid vehicle powertrain 200 parked, the engine 22' may drive the first electric motor/generator 16' to provide auxiliary power or charge the battery 219.

It should also be noted that the exemplary embodiments of the electric CVT 10 should not be limited to application in hybrid vehicles. The electric CVT 10 is readily applicable in conventional combustion engine vehicles as well.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A continuously variable transmission comprising:
a first planetary gearset;
a second planetary gearset operably coupled to said first planetary gearset;
an input shaft rotatably coupled to each of said first and second planetary gearsets for selectively providing a drive torque;
an output shaft rotatably coupled to said second planetary gearset;
a first electric motor operably coupled to said first planetary gearset for selectively functioning to one of either rotatably drive said first planetary gearset and retard rotation of said first planetary gearset;
a second electric motor operably coupled to said second planetary gearset for selectively functioning to one of either rotatably drive said second planetary gearset and retard rotation of said second planetary gearset; and
a brake for selectively braking rotation of said input shaft;
wherein said first and second electric motors function to selectively manipulate rotation of said first and second planetary gearsets for varying a drive ratio between said input shaft and said output shaft.

2. The continuously variable transmission of claim 1, further comprising a second brake disposed between said first electric motor and said first planetary gearset for selectively prohibiting one of either driving and retarding of said first planetary gearset by said first electric motor.

3. The continuously variable transmission of claim 1, wherein a low speed mode is achieved by said second electric motor retarding rotational motion of said second planetary gear set and said first electric motor driving said first planetary gear set.

4. The continuously variable transmission of claim 3, wherein said second electric motor generates electric energy for assisting in powering said first electric motor for driving said first planetary gear set.

5. The continuously variable transmission of claim 1, wherein an intermediate speed mode is achieved by said first electric motor retarding rotational motion of said first planetary gear set and said second electric motor driving said second planetary gear set.

6. The continuously variable transmission of claim 5, wherein said first electric motor generates electric energy for assisting in powering said second electric motor for driving said second planetary gear set.

7. The continuously variable transmission of claim 2, wherein a high speed mode is achieved by said second brake prohibiting one of either driving and retarding of said first planetary gearset by said first electric motor, thereby enabling said input shaft to directly drive said output shaft.

8. The continuously variable transmission of claim 1, wherein said input shaft drives a carrier of said first planetary gear set and a sun gear of said second planetary gear set.

9. The continuously variable transmission of claim 1, wherein said output shaft is driven by a carrier of said second planetary gear set.

10. The continuously variable transmission of claim 1, wherein said input shaft is fixed for rotation with a carrier of said first planetary gear set and a sun gear of said second planetary gear set.

11. The continuously variable transmission of claim 1, wherein a ring gear of said first planetary gear set is fixed for rotation with a carrier of said second planetary gear set.

12. The continuously variable transmission of claim 1, further comprising a controller for controlling each of said first and second electric motors.

13. The continuously variable transmission of claim 1, further comprising a power source for powering either of said first and second electric motors.

14. A hybrid vehicle comprising:
   an engine;
   a transmission operably attached to said engine, said transmission including:
      a first planetary gearset;
      a second planetary gearset operably coupled to said first planetary gearset;
      an input shaft rotatably coupled to said engine and each of said first and second planetary gearsets for inputting a drive torque from said engine;
      an output shaft rotatably coupled to said second planetary gearset;
      a first electric motor operably coupled to said first planetary gearset for selectively functioning to one of either rotatably drive said first planetary gearset and retard rotation of said first planetary gearset;
      a second electric motor operably coupled to said second planetary gearset for selectively functioning to one of either rotatably drive said second planetary gearset and retard rotation of said second planetary gearset; and
      a brake for selectively braking rotation of said input shaft;
      wherein said first and second electric motors function to selectively manipulate rotation of said first and second planetary gearsets for varying a drive ratio between said input shaft and said output shaft; and
   a first driveline operably interconnected with said output shaft for driving a first set of wheels.

15. The hybrid vehicle of claim 14, further comprising a second brake disposed between said first electric motor and said first planetary gearset for selectively prohibiting one of either driving and retarding of said first planetary gearset by said first electric motor.

16. The hybrid vehicle of claim 14, wherein a low speed mode is achieved by said second electric motor retarding rotational motion of said second planetary gear set and said first electric motor driving said first planetary gear set.

17. The hybrid vehicle of claim 16, wherein said second electric motor generates electric energy for assisting in powering said first electric motor for driving said first planetary gear set.

18. The hybrid vehicle of claim 14, wherein an intermediate speed mode is achieved by said first electric motor retarding rotational motion of said first planetary gear set and said second electric motor driving said second planetary gear set.

19. The hybrid vehicle of claim 18, wherein said first electric motor generates electric energy for assisting in powering said second electric motor for driving said second planetary gear set.

20. The hybrid vehicle of claim 15, wherein a high speed mode is achieved by said second brake prohibiting one of either driving and retarding of said first planetary gearset by said first electric motor, thereby enabling said input shaft to directly drive said output shaft.

21. The hybrid vehicle of claim 14, wherein said input shaft drives a carrier of said first planetary gear set and a sun gear of said second planetary gear set.

22. The hybrid vehicle of claim 14, wherein said output shaft is driven by a carrier of said second planetary gear set.

23. The hybrid vehicle of claim 14, wherein said input shaft is fixed for rotation with a carrier of said first planetary gear set and a sun gear of said second planetary gear set.

24. The hybrid vehicle of claim 14, wherein a ring gear of said first planetary gear set is fixed for rotation with a carrier of said second planetary gear set.

25. The hybrid vehicle of claim 14, further comprising a controller for controlling each of said first and second electric motors.

26. The hybrid vehicle of claim 14, further comprising a power source for powering either of said first and second electric motors.

27. The hybrid vehicle of claim 14, further comprising a second driveline operably interconnected with said output shaft for driving a second wheel.

28. The hybrid vehicle of claim 27, further comprising a transfer mechanism for mechanically interconnecting said output shaft with a second output shaft for driving said second wheel.

29. The hybrid vehicle of claim 28, wherein said transfer mechanism comprises:
   a first gear fixed for rotation with said output shaft;
   a second gear interconnected for rotation with said second output shaft; and
   a transfer member for operably interconnecting said first and second gears, whereby rotation of said first gear drives rotation of said second gear.

30. The hybrid vehicle of claim 29, wherein said transfer mechanism further comprises a clutch pack interconnecting said second gear and said second output shaft for selectively retarding rotational motion of the second output shaft, relative to rotational motion of the second gear.

31. The hybrid vehicle of claim 27, further comprising a third electric motor in electrical communication with a controller for selectively driving said second set of wheels, said controller in electrical communication with said transmission.

32. A continuously variable transmission comprising:
   a first planetary gearset;
   a second planetary gearset operably coupled to said first planetary gearset;

an input shaft rotatably coupled to each of said first and second planetary gearsets for selectively providing a drive torque;

an output shaft rotatably coupled to said second planetary gearset;

a first electric motor operable to selectively drive said first planetary gearset; and a second electric motor operable to selectively drive said second planetary gearset;

wherein actuation of said first and second electric motors functions to control rotation of said first and second planetary gearsets for varying a drive ratio between said input shaft and said output shaft such that a low speed mode is achieved when said second electric motor slows rotation of said second planetary gearset and said first electric motor drives said first planetary gearset.

33. The continuously variable transmission of claim 32 further comprising a brake disposed between said first electric motor and said first planetary gearset.

34. The continuously variable transmission of claim 32 further comprising a brake operable for selectively braking rotation of said input shaft.

35. The continuously variable transmission of claim 32 wherein said second electric motor generates electric energy for assisting in powering said first electric motor for driving said first planetary gearset.

36. The continuously variable transmission of claim 32 wherein an intermediate speed mode is achieved by said first electric motor retarding rotational motion of said first planetary gearset and said second electric motor driving said second planetary gearset.

37. The continuously variable transmission of claim 36 wherein said first electric motor generates electric energy for assisting in powering said second electric motor for driving said second planetary gearset.

38. A hybrid vehicle comprising:

an engine;

a transmission operably attached to said engine, said transmission including a first planetary gearset, a second planetary gearset operably coupled to said first planetary gearset, an input shaft rotatably coupled to said engine and each of said first and second planetary gearsets for inputting a drive torque from said engine, an output shaft rotatably coupled to said second planetary gearset, a first electric motor operably coupled to said first planetary gearset for functioning to selectively drive or brake rotation of said first planetary gearset, and a second electric motor operably coupled to said second planetary gearset for functioning to selectively drive or brake rotation of said second planetary gearset, wherein a first speed mode is established between said input shaft and said output shaft when said second electric motor slows rotary motion of said second planetary gearset and said first electric motor drives said first planetary gearset; and a first driveline operably interconnected with said output shaft for driving a first set of wheels.

39. The hybrid vehicle of claim 38 further comprising a brake disposed between said first electric motor and said first planetary gearset.

40. The hybrid vehicle of claim 38 further comprising a brake operable for selectively braking rotation of said input shaft, thereby enabling either of said first and second electric motors to selectively drive said transmission in an electric mode.

41. The hybrid vehicle of claim 38 wherein said second electric motor generates electric energy for assisting in powering said first electric motor for driving said first planetary gearset.

42. The hybrid vehicle of claim 38 wherein a second speed mode is achieved when said first electric motor retards rotary motion of said first planetary gearset and said second electric motor drives said second planetary gearset.

43. The hybrid vehicle of claim 42 wherein said first electric motor generates electric energy for assisting in powering said second electric motor for driving said second planetary gearset.

44. The hybrid vehicle of claim 42 wherein a third speed mode is achieved by a brake prohibiting one of either driving and retarding of said first planetary gearset by said first electric motor such that said input shaft directly drives said output shaft.

45. A hybrid vehicle comprising:

an engine;

a transmission including a first planetary gearset, a second planetary gearset operably coupled to said first planetary gearset, an input shaft driven by said engine and coupled to each of said first and second planetary gearsets, a first output shaft rotatably coupled to said second planetary gearset, a second output shaft, a first electric motor operable for selectively driving said first planetary gearset, and a second electric motor operable for selectively driving said second planetary gearset;

a first driveline operably interconnected with said first output shaft for driving a first set of wheels;

a second driveline operably interconnected to said second output shaft for driving a second set of wheels; and a transfer mechanism for coupling said second output shaft to said first output shaft.

46. The hybrid vehicle of claim 45 when said transmission further when said transmission further comprises a brake disposed between said first electric motor and said first planetary gearset.

47. The hybrid vehicle of claim 45 when said transmission further comprises a brake for selectively braking rotation of said input shaft.

48. The hybrid vehicle of claim 45 wherein said transfer mechanism comprises:

a first gear fixed for rotation with said first output shaft;

a second gear interconnected for rotation with said second output shaft; and a transfer member for operably interconnecting said first and second gears, whereby rotation of said first gear drives rotation of said second gear.

49. The hybrid vehicle of claim 48 wherein said transfer mechanism further comprises a clutch for selectively coupling said second gear to said second output shaft.

50. A continuously variable transmission for use in a motor vehicle having an engine and a driveline, comprising:

an input shaft adapted to be driven by the engine;

an output shaft adapted for connection to the driveline;

a first gearset having a first carrier driven by said input shaft and a set of first planet gears rotatably supported from said first carrier and which are meshed with a first sun gear and a first ring gear;

a second gearset having a second carrier coupled to said first ring gear and said output shaft, a second sun gear driven by said input shaft, a second ring, and a set of second planet gears rotatably supported from said second carrier and which are meshed with said second ring gear and said second sun gear;

a first motor having a first rotary output coupled to said first sun gear;

a second motor having a second rotary output coupled to second ring gear;

a first brake for selectively braking rotation of said input shaft;

a second brake for selectively braking rotation of said first sun gear; and a control system for controlling actuation of said first and second motors and said first and second brakes to establish variable speed drive ratios between said input shaft and said output shaft.

51. A continuously variable transmission for use in a motor vehicle having an engine and a driveline, comprising:

an input shaft adapted to be driven by the engine;

an output shaft adapted for connection to the driveline;

a first gearset having a first carrier driven by said input shaft and a set of first planet gears rotatably supported from said first carrier and which are meshed with a first sun gear and a first ring gear;

a second gearset having a second carrier coupled to said first ring gear and said output shaft, a second sun gear driven by said input shaft, a second ring, and a set of second planet gears rotatably supported from said second carrier and which are meshed with said second ring gear and said second sun gear;

a first motor having a first rotary output coupled to said first sun gear;

a second motor having a second rotary output coupled to second ring gear;

a brake for selectively braking rotation of said input shaft; and a control system for controlling actuation of said first and second motors and said brake to establish variable speed drive ratio between said input shaft and said output shaft.

* * * * *